Figure 1:
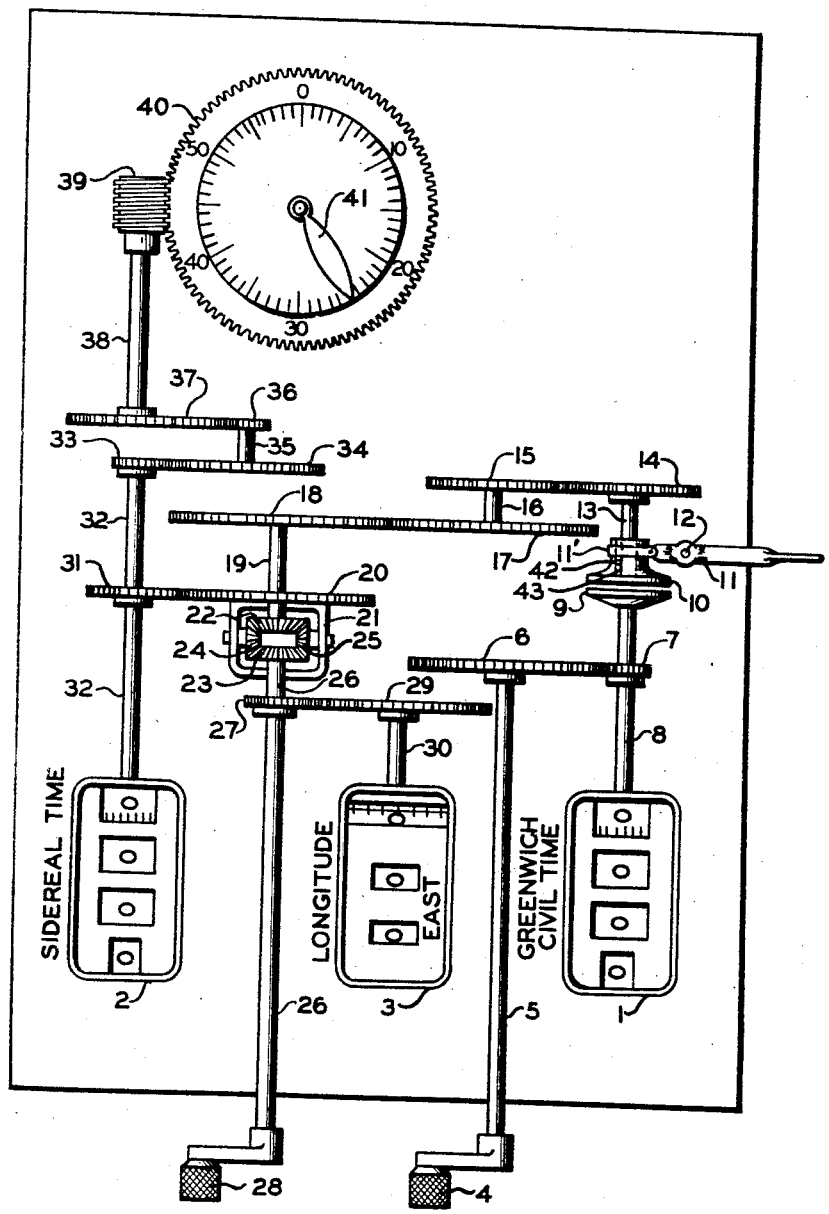

Feb. 16, 1943.  T. L. THURLOW ET AL  2,311,005
NAVIGATION COMPUTER
Filed July 31, 1940  2 Sheets-Sheet 1

Patented Feb. 16, 1943

2,311,005

UNITED STATES PATENT OFFICE 2,311,005

NAVIGATION COMPUTER

Thomas L. Thurlow and Samuel M. Burka, Dayton, Ohio

Application July 31, 1940, Serial No. 348,968

1 Claim. (Cl. 235—61)

(Granted under the act of March 3, 1883, as amended April 30, 1928; 370 O. G. 757)

The invention described herein may be manufactured and used by or for the Government for governmental purposes, without the payment to us of any royalty thereon.

This device primarily relates to an apparatus for computing longitude, when Greenwich civil time and local sidereal time are known. The apparatus may also be used to compute local sidereal time, knowing longitude and Greenwich civil time.

A secondary feature is the combination of the device with a telescope-training and driving mechanism in such a manner that the telescope may be trained on different celestial bodies without disturbing the continuous operation of the driving mechanism and the time-indicating mechanism.

In the navigation of aircraft it has become known to fix the position of aircraft by means of precomputed lines of position used in conjunction with observations on celestial bodies. One such system is simultaneous altitude observations on two stars used in conjunction with a form of precomputed lines of position printed in a book on Star Altitude Curves, United States Army Air Corps, published by Weems System of Navigation, Annapolis, Md.

Simultaneous altitude observations of two stars having been made, the latitude and local sidereal time of the observation position are obtainable from the intersection of lines of position of the two stars in the Star Altitude Curves book, latitude being readable as the ordinate, and local sidereal time as the abscissa. After the navigator has obtained Greenwich civil time from a chronometer, and local sidereal time from the Star Altitude Curves, it is necessary to mathematically convert Greenwich civil time to sidereal time for a given longitude, obtain the algebraic difference between local sidereal time and the sidereal time of the given longitude for the time of the observation, and convert the difference into longitude in units of arc. It is essential that these latter calculations be made rapidly and accurately, especially when fixing the position of a fast moving airplane. It is for that purpose that the present calculator has been devised.

It is, therefore, an object of this invention to provide a device for converting Greenwich civil time into sidereal time and obtaining the longitude of the position of observation by simultaneously obtaining the algebraic difference between the local sidereal time and Greenwich sidereal time and transforming the difference into units of arc readable as longitude.

It is a further object of this invention to provide, in connection with the sidereal-time-indicating device, an indicating device operatively associated therewith for computing and indicating the correction to an altitude observation on Polaris for the particular time in question, to thereby obtain the correct latitude of observation position.

It is a further object of this invention to combine this device with a telescope having a constant speed motor and a training mechanism, so that the telescope will follow the celestial body upon which it is trained while it is in the field of view. In adapting the mechanism, the longitude-indicating mechanism is changed so that it will indicate right ascension. By means of the new and novel apparatus illustrated in this invention, it is possible to change the position of the telescope from one celestial body to another without disconnecting the constant speed motor and, consequently, without disrupting the continuous operation of the driving mechanism and the continuity of indication of sidereal time.

Other objects and advantages of this invention will become apparent from the following description taken in connection with the accompanying drawings, it being clearly understood that the same are by way of illustration and example only and are not to be taken as in any way limiting the spirit or scope of this invention. The spirit and scope of this invention is to be limited only by the prior art and by the terms of the appended claims.

Figure 2:
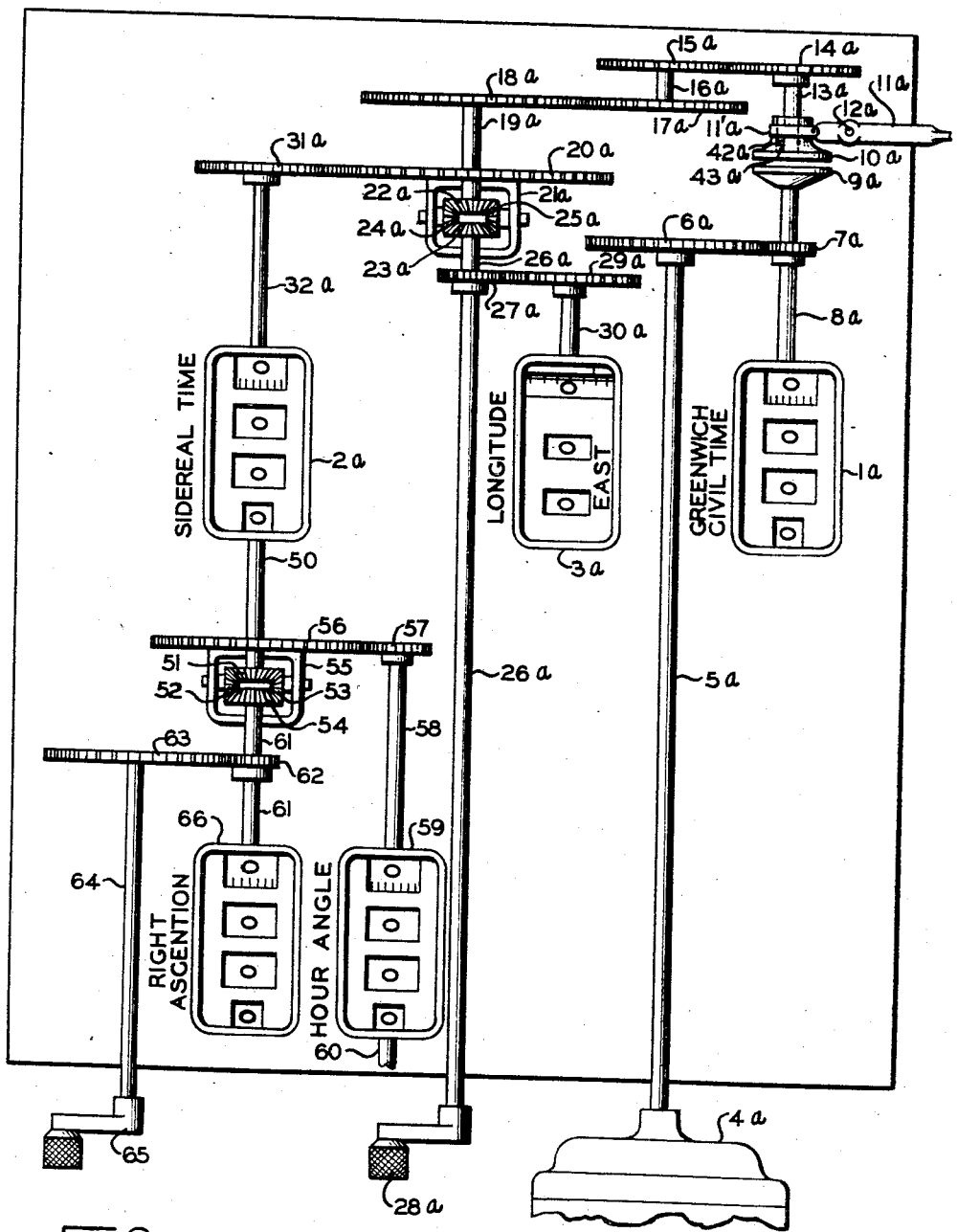

Referring to the drawings:

Figure 1 is a diagrammatic showing of a calculator in accordance with the invention; and Figure 2 is a diagrammatic showing of an adaptation of the calculator device.

Referring to the drawings, and particularly to Figure 1, there are shown three counter mechanisms of the well-known Veeder type. Counter 1 indicates Greenwich civil time in hours, minutes, and seconds for any particular indicated day. Counter 2 indicates sidereal time, either Greenwich or local, in hours, minutes, and seconds for a particular indicated day. Counter 3 indicates longitude in units of degrees, minutes, and seconds.

Counter 1 is operated by manually operable handle or input means 4 in conjunction with shaft 5 having gear 6 integral therewith. Gear 6 drivingly engages gear 7, integral with shaft 8, which in turn operates the counter mechanism 1. Integral with shaft 8 is a clutch element 9, with which clutch element 10 is adapted to be moved into operative engagement by lever 11, pivotally mounted at 12 and having a collar 11' pivotally attached thereto. Element 10 is free to rotate in collar 11', but relative longitudinal movement between element 10 and collar 11' is limited. Element 10 is attached to shaft 13 by a connection comprising a pin 42 integral with shaft 13 received in a slot 43 in member 10. Member 10 is thus connected to rotate with shaft 13 and to move longitudinally with respect thereto. Shaft 13 has integral therewith a gear 14, adapted to mesh with gear 15 integral with shaft 16. Gear 17, also integral with shaft 16, meshes with gear 18. Gear 18 is integral with one end of shaft 19, the other end of shaft 19 being provided with a pinion gear 22 forming a part of a differential gearing. Shaft 19 is freely rotatable with respect to gear 20 and differential housing 21, which in turn is integral with gear 20. Gears 24 and 25, freely rotatably mounted in housing 21, are adapted to mesh with gears 22 and 23. Gear 23 is integral with shaft 26, which in turn is freely rotatably received in housing 21. Shaft 26, adapted to be manually operated by handle or input means 28, has integral therewith a gear 27 adapted to mesh with gear 29 integral with shaft 30, which in turn is operatively connected to counter mechanism 3. Gear 20 of the differential mechanism is adapted to mesh with gear 31, integral with shaft 32, which in turn is operatively connected to counter mechanism 2. The gearing system connecting shaft 13 to shaft 32 is selected as having a ratio which will convert civil time to sidereal time, differing from the ratio of the civil to the sidereal time by only two parts in ten million. The discrepancy in the above-stated ratios is equivalent to only six and one-third seconds of time, or ninety-five seconds of arc error, during the solar year. This system of gearing is disclosed in an article by A. E. Flanigan, entitled "Gear Ratios for the Conversion of Civil to Sidereal Time," published in Review of Scientific Instruments, October, 1934. The gearing system connecting shaft 32 to shaft 30 is such as to convert time units into units of arc, one hour of time being equivalent to fifteen degrees of arc.

In the operation of the device, the proper relationship between the civil and the sidereal time counters for the particular day of the observation is established by operation of handle 4, with counter 3 set at zero longitude and with the clutch in operative engagement, until the sidereal time counter 2 indicates the sidereal time of zero hours Greenwich civil time for the day of the observation, as obtained from the nautical almanac. Handle 11 is then operated to declutch shaft 8 from shaft 13 and, consequently, shaft 32. Upon further operation of handle 4, shaft 8 is rotated to set counter 1 at zero. Naturally, this adjustment need not be made if handle 4 is turned an amount to correspond to the total lapse of time since the device was last used. However, if the device has not been used for several days or more, it has been found to be more convenient to corelate civil and sidereal time by the above-described method.

With the shafts 8 and 13 operatively connected by the clutch, handle 4 is operated until counter 1 indicates Greenwich civil time as obtained from a chronometer. This civil time is converted into sidereal time by the connecting gearing, counter 3 being at zero. Since shaft 26 is stationary, shaft 19 rotates gear 20 by means of gears 24 and 25 and housing 21 which is integral with gear 20. The altitudes of at least two stars are obtained by simultaneous, or substantially simultaneous, observances thereon; and with the aid of the Star Altitude Curves, the local sidereal time and the latitude of the position of observation are obtained. Since the algebraic difference between local sidereal time as obtained from the Star Altitude Curves, and sidereal time as set on counter 2, is a measure of the longitude of the position of observation in units of time, operation of handle 28 to set the reading of the local sidereal time on counter mechanism 2 will thereby result in an indication of the longitude on counter 3 in units of arc. Since shaft 19 is stationary while operating handle 28, shaft 26 and gear 23 will cause simultaneous operation of counters 2 and 3 in a ratio relation of time to longitude in units of arc.

The device is also provided with a mechanism operatively connected with the sidereal-time-indicating means for indicating the correction to be applied to Polaris for obtaining true altitude. Shaft 32 has integral therewith a gear 33 adapted to mesh with gear 34 integral with shaft 35. Also integral with shaft 35 is a gear 36 adapted to mesh with gear 37. Gear 37 is rigidly attached at one end to shaft 38. The other end of shaft 38 is provided with a worm gear 39 adapted to mesh with and operate gear 40 carrying indicating pointer 41. Since the correction to be applied to the altitude reading of Polaris to obtain correct latitude varies from zero to plus or minus sixty-one minutes, the arrangement of gears 33, 34, 36, and 37 is such as to indicate the proper correction for any particular sidereal time indicated.

When navigating by dead reckoning and it is desired to check position, the device is used for determining which stars must be observed in order to use the precomputed curves. In the use of the device for this purpose, with counters 1 and 2 in their proper adjusted relationship for the day of observation, Greenwich civil time is applied to counter 1 and thereby converted into sidereal time on counter 2. Counter 2 will indicate Greenwich sidereal time if longitude counter 3 is set at zero. The longitude obtained by dead reckoning is applied to counter 3 and thereby converted into time units and algebraically subtracted from the Greenwich sidereal time indicated on counter 2. The resulting indication on counter 2 is local sidereal time. Using this local sidereal time in connection with Star Altitude Curves, the stars which must be used in connection with the book are determined. The altitudes of these stars are then actually observed, local sidereal time obtained from Star Altitude Curves, Greenwich civil time of observation applied to counter 1 and thereby converted into Greenwich sidereal time indicated on counter 2, after these counters have been properly coordinated and counter 2 actuated until local sidereal time as obtained from the book on lines of position appears thereon. The longitude of the position is then indicated in units of arc on indicator 3.

Referring to the adaptation of the invention illustrated in Figure 2, the device is adapted to be operatively connected in series with a well-known arrangement of a constant speed motor operatively connected to drive an equatorially mounted telescope (not shown) about its polar axis. Such an arrangement is illustrated on Pages 49, 50, and 51 of General Astronomy by Young, published by Ginn and Co., Boston, Mass. By means of the differential gearing, the telescope may be trained on a selected star without disturbing the operation of the constant speed motor and its operative connection with the indicating mechanism.

Referring to Figure 2, constant speed motor 4a is drivingly connected to one end of shaft 5a. Integral with the other end of shaft 5a is a gear 6a adapted to drivingly mesh with gear 7a. Gear 7a is fastened to shaft 8a, which in turn is operatively connected to Greenwich civil time counter 1a. Counter 1a and sidereal time counter 2a are operatively connected in predetermined ratio relationship by a train of gears and shafts corresponding to those illustrated in Figure 1. These elements comprise shaft 8a, clutch elements 9a and 10a, shaft 13a, gears 14a and 15a, shaft 16a, gears 17a and 18a, shaft 19a, pinion gear 22a, spider gears 24a and 25a, casing 21a, ring gear 20a, gear 31a, and shaft 32a. Clutch element 10a is connected to shaft 13a by pin 42a and slot 43a, as described in connection with the corresponding structure in Figure 1. Longitude indicator 3a is operatively connected to sidereal-time indicator 2a by shaft 30a, gears 29a and 27a, shaft 26a, pinion gear 23a, spider gears 24a and 25a, housing 21a, ring gear 20a, gear 31a, and shaft 32a. This gearing arrangement is so selected as to convert time units into units of arc. Shaft 26a is provided with a handle 28a for manual operation to convert sidereal time to longitude. All of the elements so far described in connection with Figure 2 are identical with those in Figure 1 with the exception of the constant speed motor 4a. Operatively connected to counter 2a and shaft 32a is a shaft 50 having a gear 51 thereon adapted to mesh with spider gears 52 and 53, freely rotatably carried by housing 55. Housing 55 is integral with ring gear 56 and rotatable with respect to shafts 50 and 61. Ring gear 56 is adapted to mesh with gear 57 integral with shaft 58, which in turn drives local hour angle counter mechanism 59. The ratio of gears 56 to 57 is one to two to counteract the effect of the differential gearing arrangement and enable shafts 50 and 58 to rotate at the same speed. Operatively connected to shaft 58 to be driven thereby is a shaft 60 adapted to be drivingly connected to a telescope (not shown) equatorially mounted to rotate about its polar axis at the rate of one degree per rotation of shaft 58. Shaft 61, having a pinion gear 64 integral therewith adapted to mesh with spider gears 52 and 53, is operatively connected with Right Ascension counter mechanism 66. Counter 66 is adapted to be driven by manually operable handle 65 through shaft 64 and gear 63 integral therewith. Gear 63 drivingly meshes with gear 62 integral with shaft 61.

In the operation of this embodiment of the invention, a civil time constant speed motor 4a drives shaft 5a at the rate of one revolution per civil minute. Greenwich civil time is continuously indicated on counter 1a, sidereal time on counter 2a, and local hour angle on counter 53. Shaft 60 will be driven so that the telescope training mechanism driven thereby will follow the celestial body, if of constant right ascension, across the sky in the hour angle without further attention or resetting.

If it is desired to direct the telescope to another celestial body, the telescope may be retrained, and a new right ascension value and hour angle value applied to counter mechanisms 66 and 59 respectively by means of crank 65 without disturbing the setting on the other counter mechanisms of the civil and sidereal time readings. This described operation constitutes the functions of this embodiment of the invention, which are in addition to the functions of the first described embodiment of the invention.

Obviously, if this embodiment of the invention were to be used in a permanent location, longitude counter 3a and the gearing driving the same could be eliminated.

We claim:

An instrument for determining longitude from Greenwich civil time and local sidereal time, comprising a first counter for indicating Greenwich civil time, input means for operating said first counter, a second counter for indicating sidereal time, gear means including a differential for drivingly connecting said two counters in a ratio relationship of civil time to sidereal time, a third counter for indicating longitude, input means for operating said third counter, gear means including said differential for independently drivingly connecting said second and third mentioned counters in a ratio relationship of sidereal time to longitude, whereby operation of said input means for said first counter to indicate thereon Greenwich civil time obtained from a chronometer results in an indication on said second counter of the corresponding Greenwich sidereal time, and operation of said input means for said third counter to change the reading on said second counter from Greenwich sidereal time to local sidereal time obtained from astronomical observations, results in an indication of local longitude on said third counter.

THOMAS L. THURLOW.
SAMUEL M. BURKA.